United States Patent
Upadhyay et al.

(10) Patent No.: US 11,782,803 B2
(45) Date of Patent: Oct. 10, 2023

(54) SYSTEM AND METHOD FOR SNAPSHOT CLEANUP AND REPORT CONSOLIDATION

(71) Applicant: EMC IP Holding Company LLC, Hopkinton, MA (US)

(72) Inventors: Navneet Upadhyay, Noida (IN); Shraddha Chunekar, Indore (IN); Sunder Ramesh Andra, Bangalore (IN); Yasemin Ugur-Ozekinci, Ontario (CA); Deepthi Urs, Bangalore (IN); Amith Ramachandran, Bangalore (IN); Adrian Dobrean, Ontario (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 169 days.

(21) Appl. No.: 17/483,933

(22) Filed: Sep. 24, 2021

(65) Prior Publication Data
US 2023/0102433 A1   Mar. 30, 2023

(51) Int. Cl.
G06F 11/14   (2006.01)
(52) U.S. Cl.
CPC ...... *G06F 11/1469* (2013.01); *G06F 11/1435* (2013.01); *G06F 11/1451* (2013.01); *G06F 11/1464* (2013.01); *G06F 2201/84* (2013.01)
(58) Field of Classification Search
None
See application file for complete search history.

(56) References Cited

U.S. PATENT DOCUMENTS

| | | | | |
|---|---|---|---|---|
| 6,665,815 B1 * | 12/2003 | Goldstein | ........... | G06F 11/1451 714/E11.123 |
| 8,706,833 B1 * | 4/2014 | Bergant | .............. | G06F 16/1756 709/215 |
| 9,020,987 B1 | 4/2015 | Nanda et al. | | |
| 9,342,550 B1 | 5/2016 | Manmohan et al. | | |
| 9,348,702 B2 * | 5/2016 | Hsu | ..................... | G06F 11/1438 |
| 9,881,014 B1 * | 1/2018 | Bono | ...................... | G06F 3/065 |
| 10,496,487 B1 * | 12/2019 | Natanzon | ........... | G06F 11/1451 |
| 2003/0154305 A1 | 8/2003 | Bethmangalkar et al. | | |
| 2005/0004931 A1 | 1/2005 | Kihara et al. | | |
| 2010/0274763 A1 | 10/2010 | Ingen et al. | | |
| 2014/0244583 A1 | 8/2014 | Wang et al. | | |
| 2016/0210342 A1 | 7/2016 | Vallabhaneni et al. | | |
| 2016/0274975 A1 | 9/2016 | Chen et al. | | |

(Continued)

OTHER PUBLICATIONS

Preston de Guise. Data Protection: Ensuring Data Availability. May 2020. CRC Press. 2nd ed. pp. 137-156.*

*Primary Examiner* — Nathan Sadler
(74) *Attorney, Agent, or Firm* — Chamberlain, Hrdlicka, White, Williams, & Aughtry

(57) ABSTRACT

A method for data consolidation and preservation during backups of data stored in a source device from the source device to a target device is provided. The method is executed by the source device and includes: obtaining a first snapshot of the data and a second snapshot of the data; generating, in response to the obtaining, a first snapshot difference report using the first snapshot and the second snapshot; transmitting, in response to generating the first snapshot difference report, the first snapshot difference report to the target device to be stored with a backup copy of the data; and deleting, in response to transmitting the first snapshot difference report, the first snapshot.

20 Claims, 12 Drawing Sheets

(56) References Cited

U.S. PATENT DOCUMENTS

| | | |
|---|---|---|
| 2018/0024853 A1 | 1/2018 | Warfield et al. |
| 2019/0278663 A1* | 9/2019 | Mehta et al. |
| 2019/0332488 A1* | 10/2019 | Bono .................. H04L 67/1097 |
| 2020/0042633 A1* | 2/2020 | Schneider ............ G06F 11/1443 |
| 2021/0049079 A1 | 2/2021 | Kumar et al. |
| 2022/0004461 A1 | 1/2022 | Jain et al. |
| 2022/0318099 A1 | 10/2022 | Kotwal et al. |
| 2022/0405302 A1* | 12/2022 | Grunwald ............ G06F 16/9024 |
| 2023/0096910 A1* | 3/2023 | Chunekar ........... G06F 11/1469 |
| | | 714/6.3 |

* cited by examiner

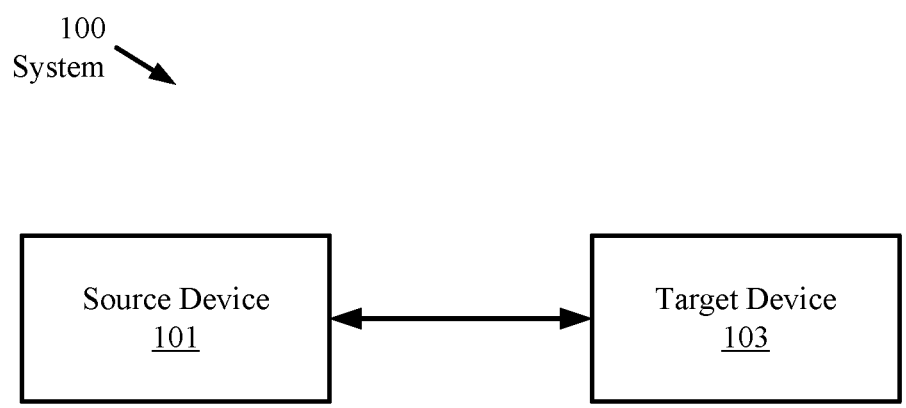
FIG. 1.1

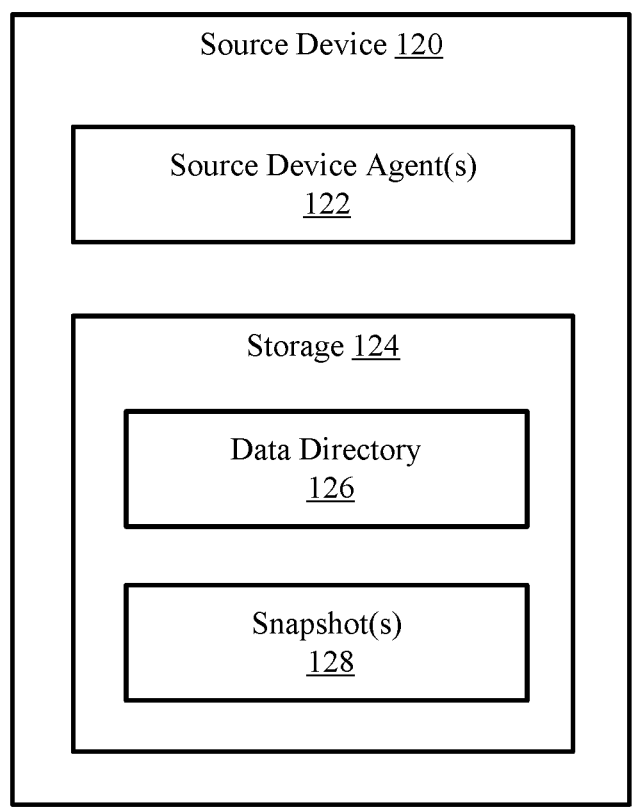
FIG. 1.2

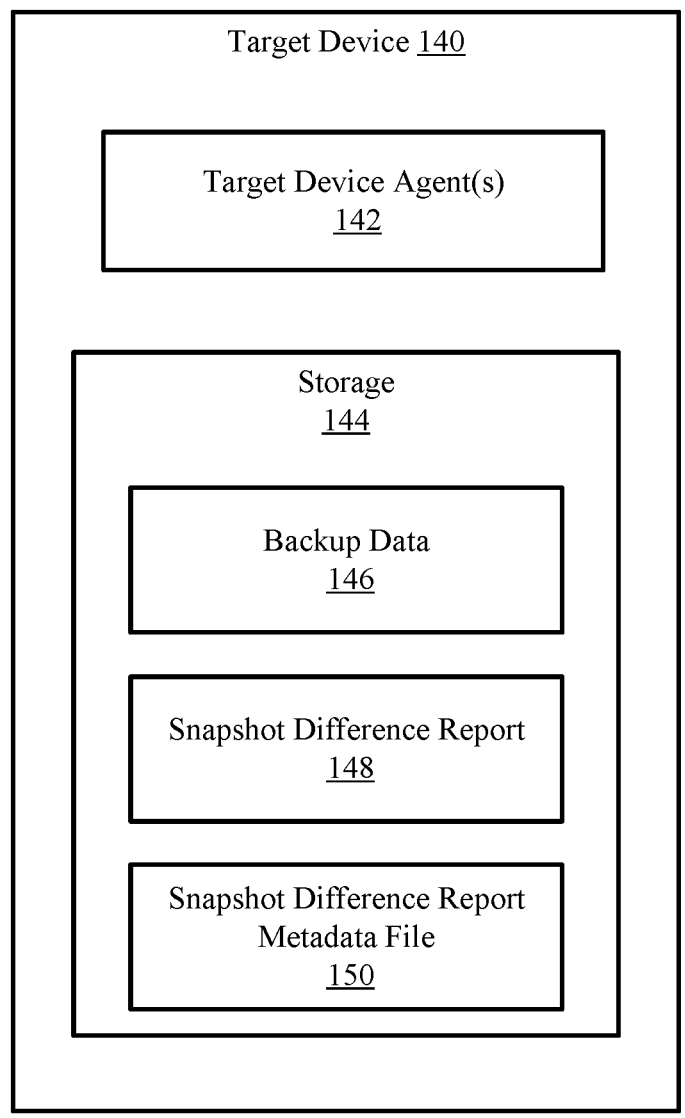
FIG. 1.3

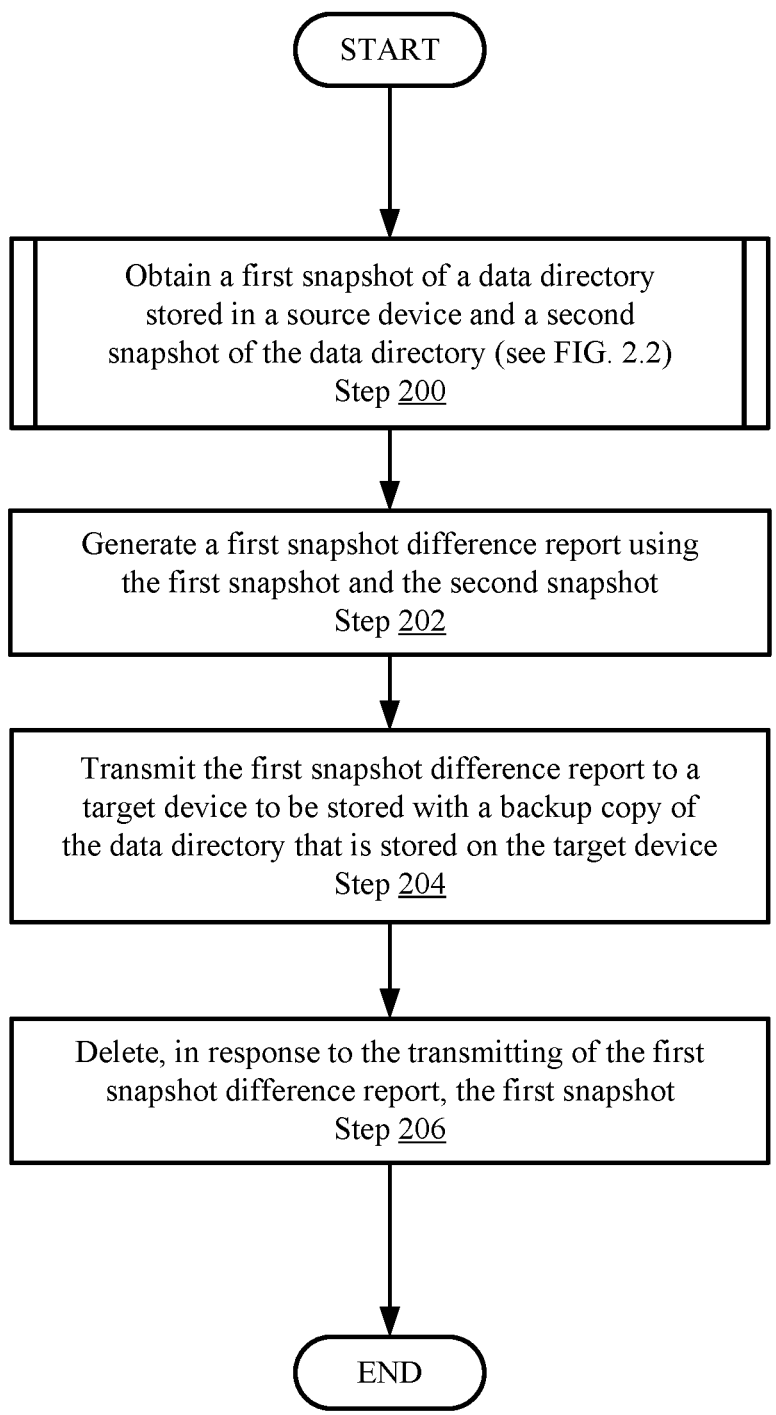
FIG. 2.1

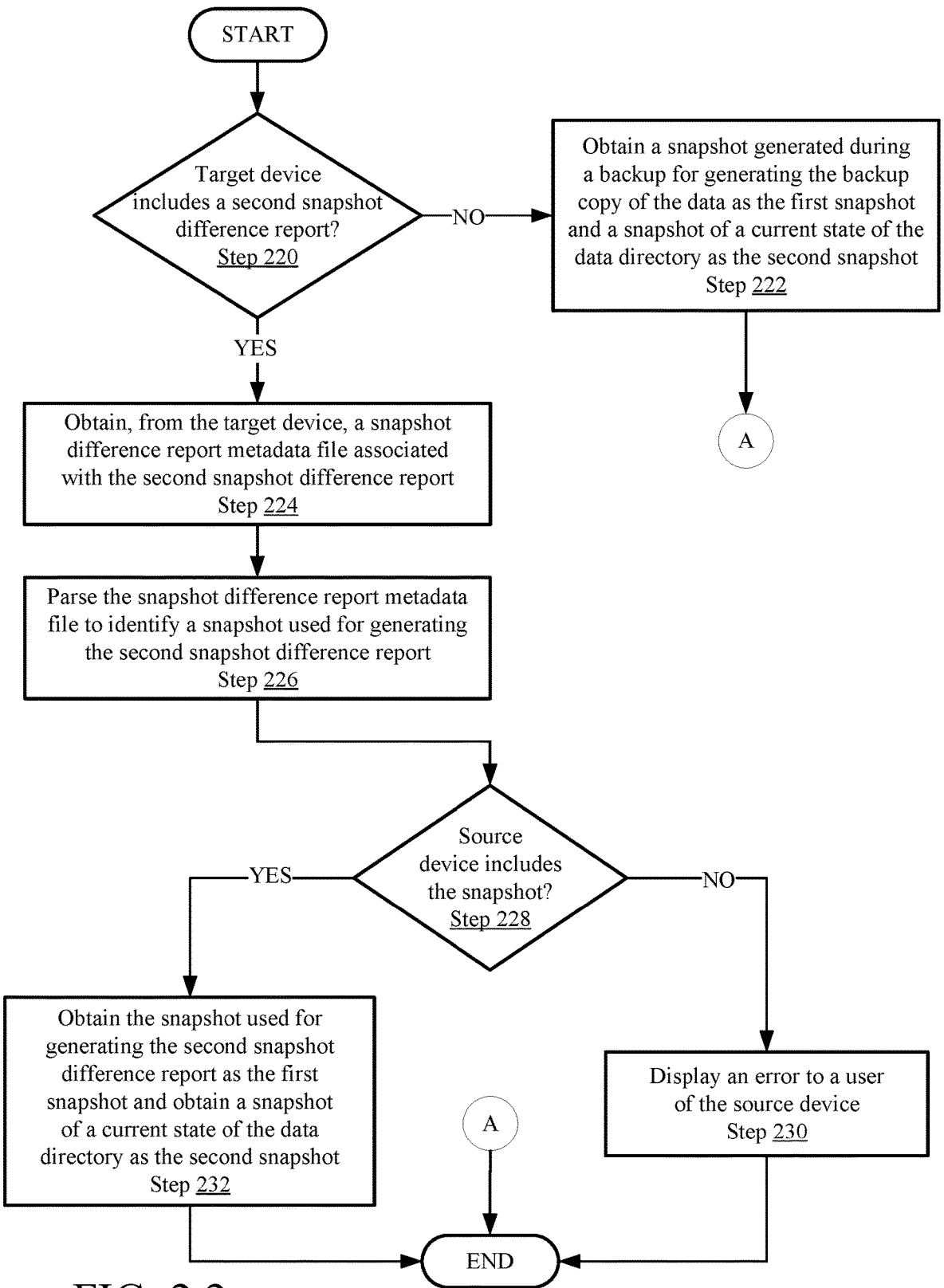
FIG. 2.2

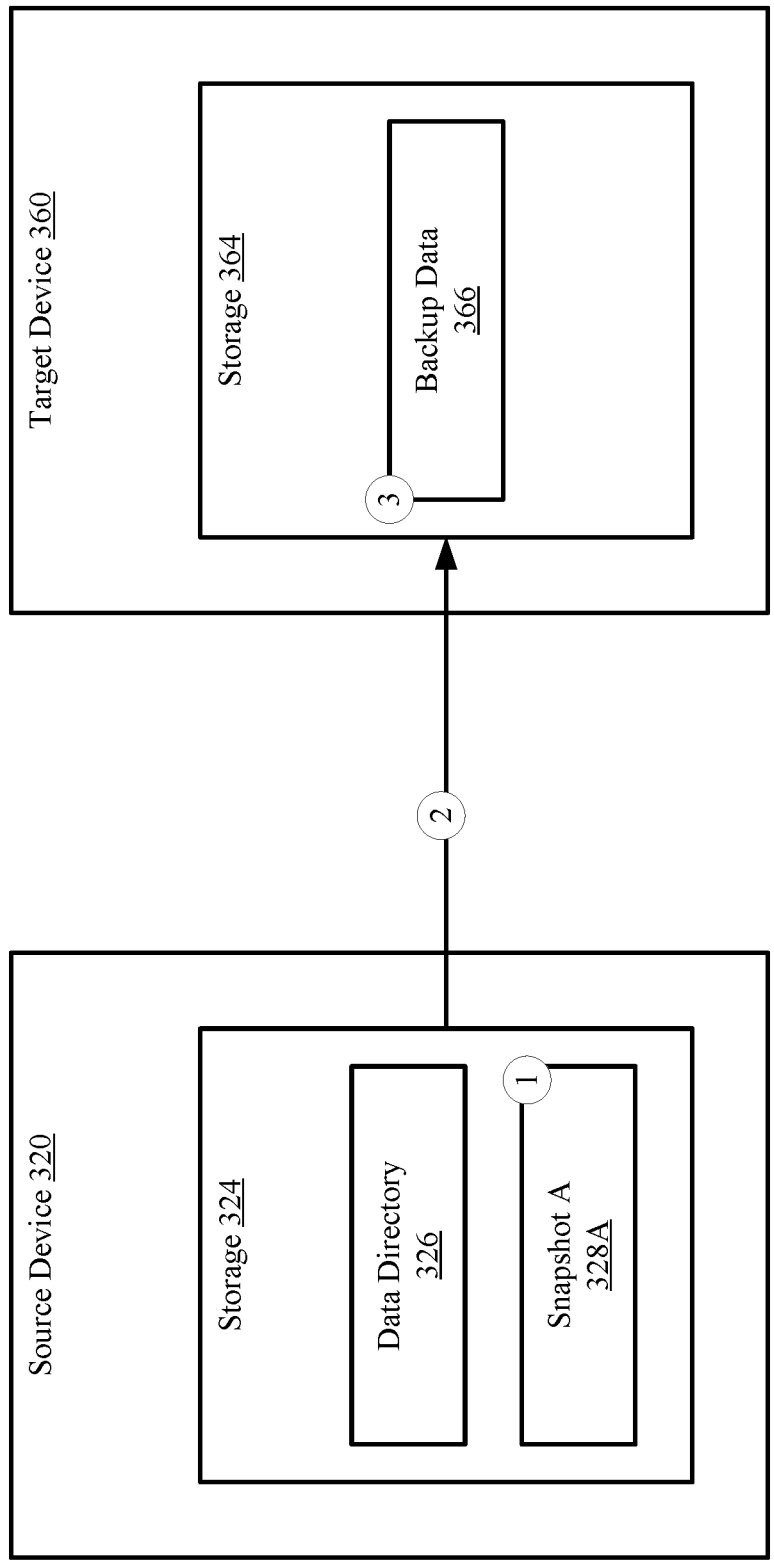
FIG. 3.1

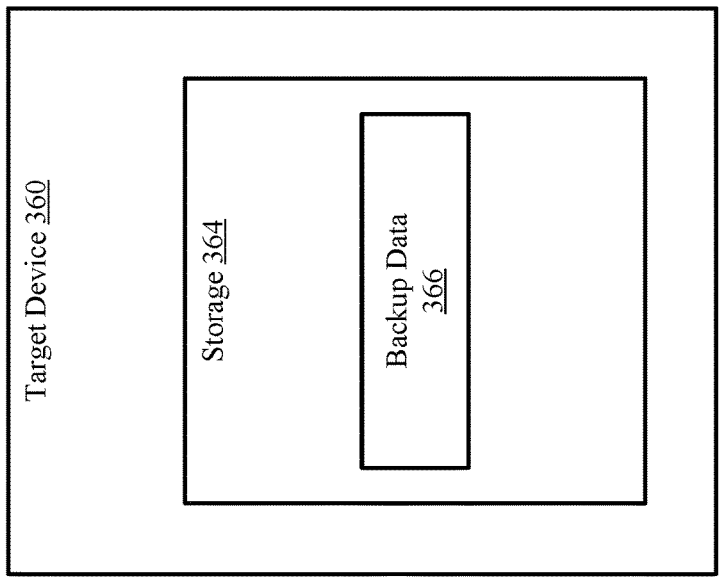
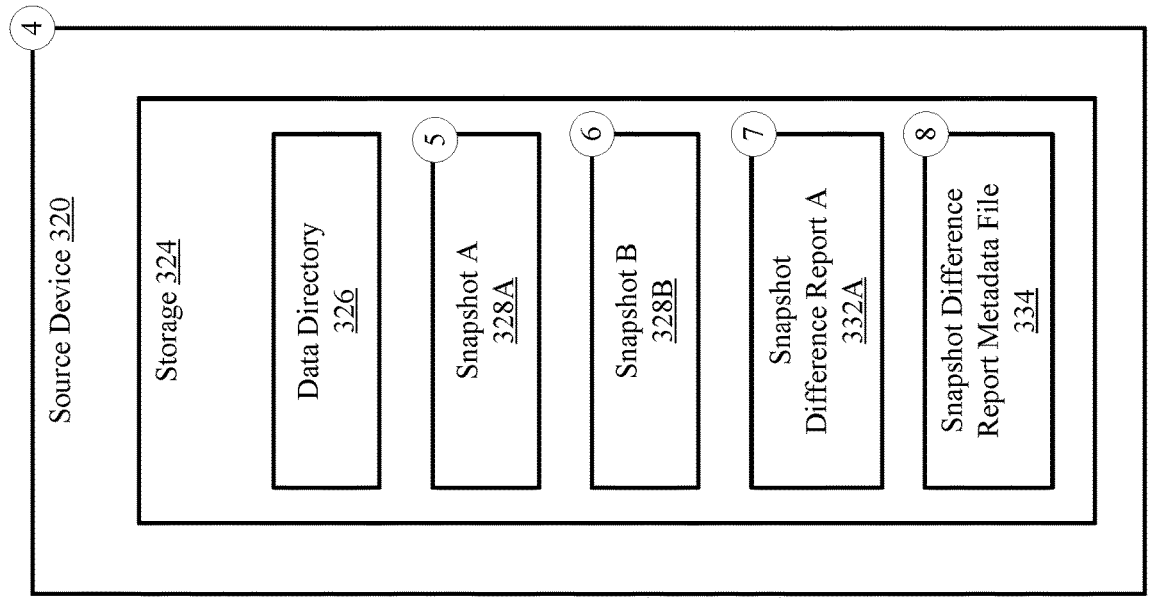
FIG. 3.2

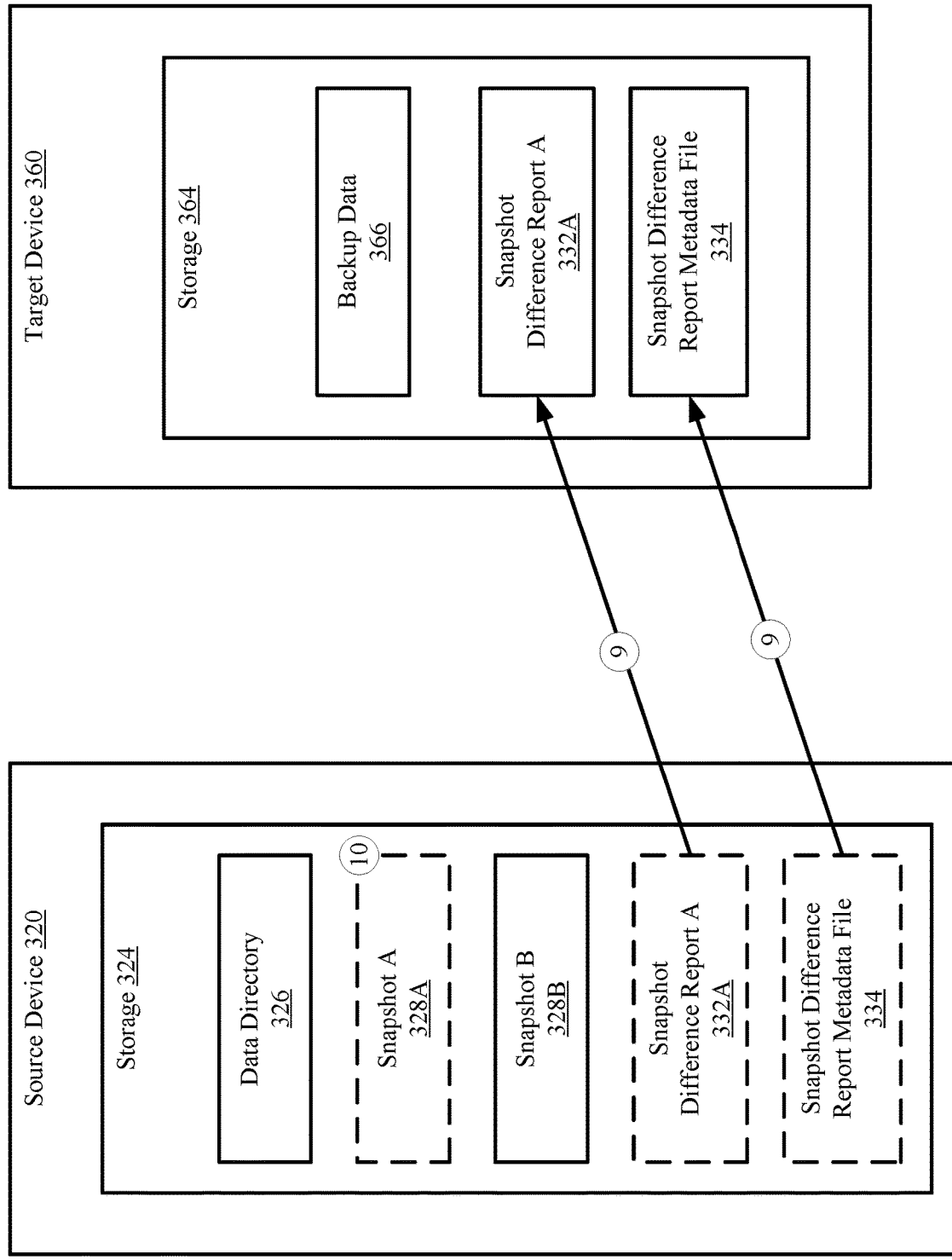
FIG. 3.3

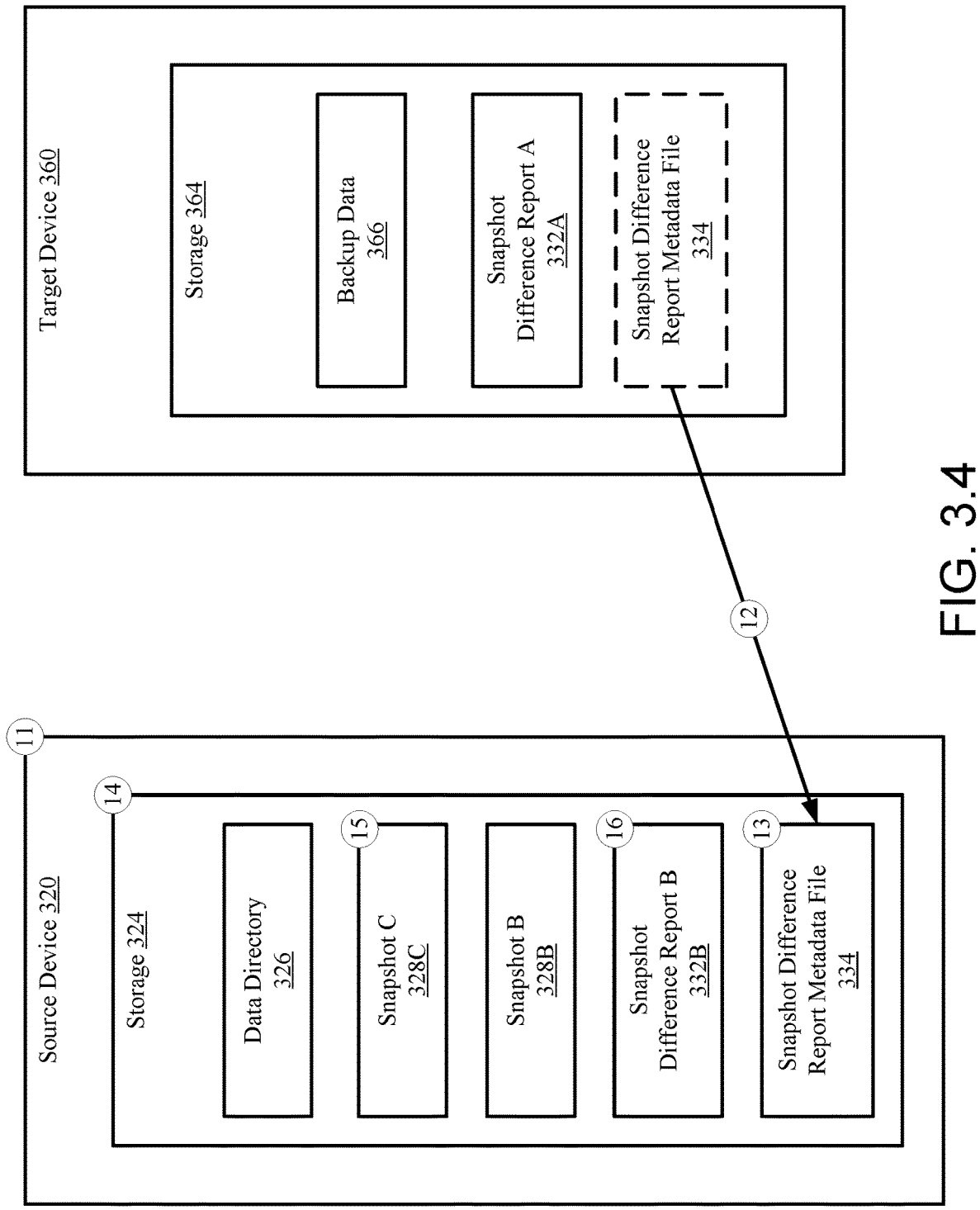
FIG. 3.4

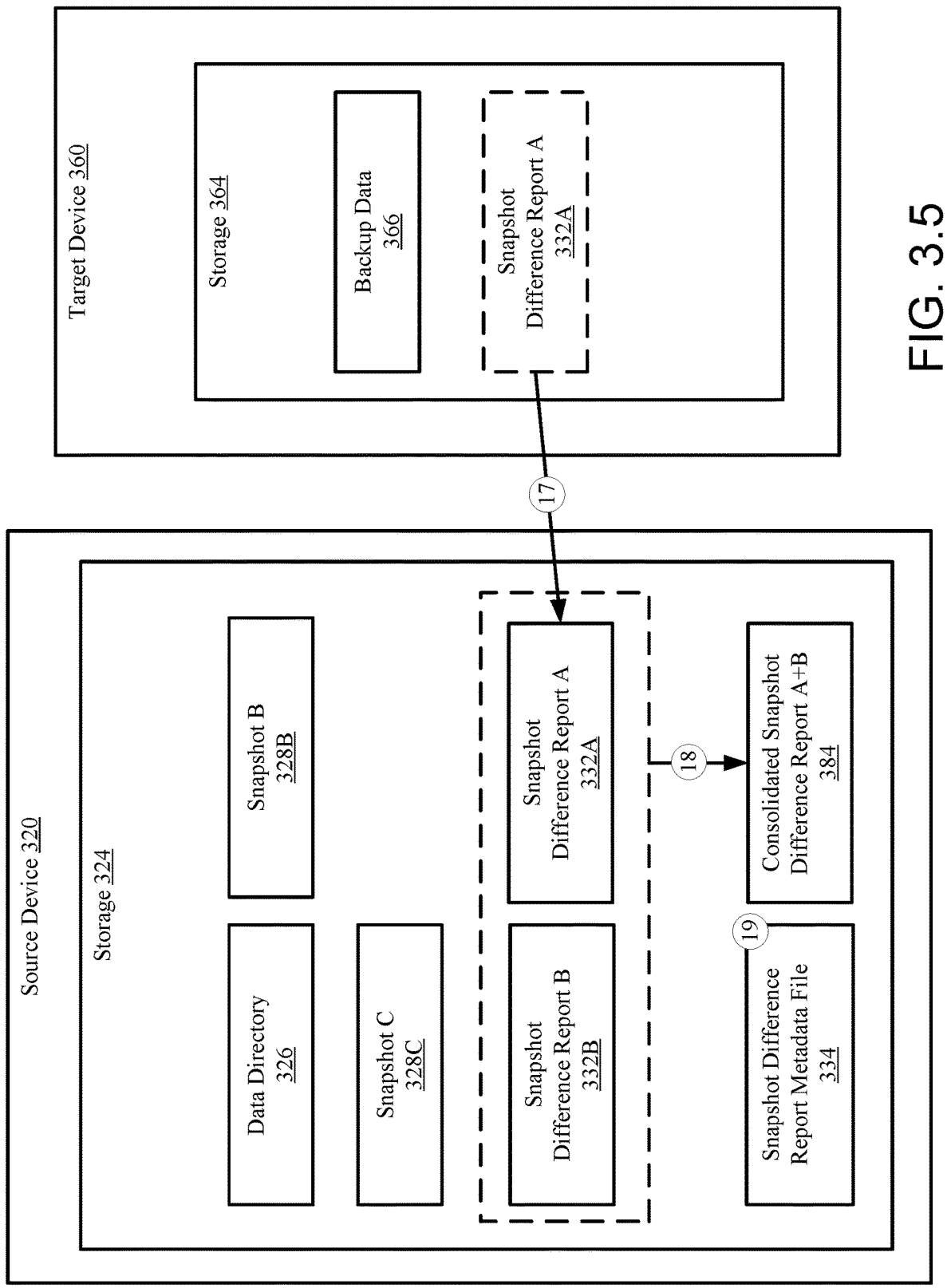
FIG. 3.5

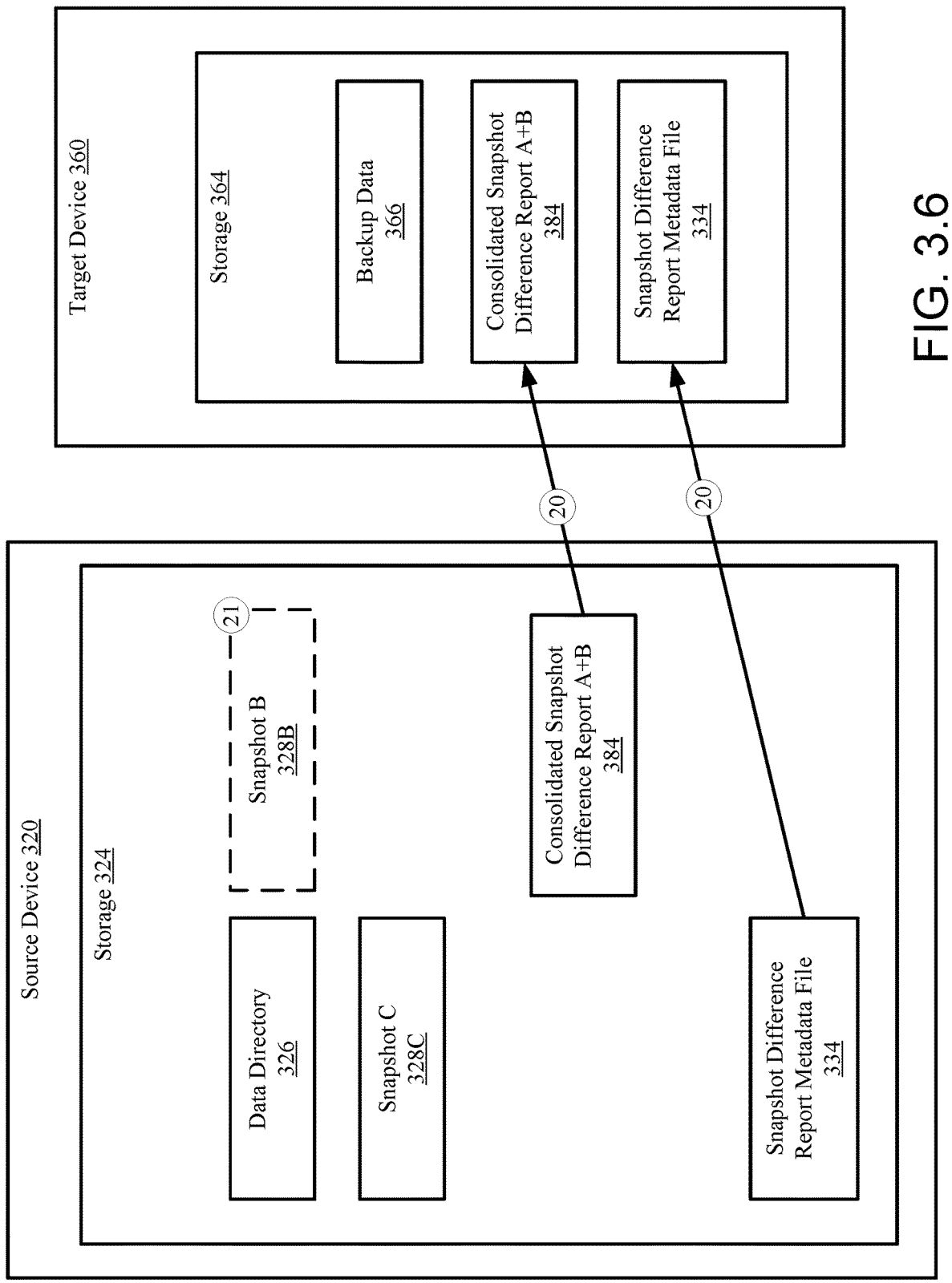
FIG. 3.6

//h1 US 11,782,803 B2

SYSTEM AND METHOD FOR SNAPSHOT CLEANUP AND REPORT CONSOLIDATION

BACKGROUND

Failures in storage devices (e.g., large-scale distributed file systems) are often considered normal events. Therefore, storage devices are designed to be highly fault tolerant by including different types of backup features. Many of these backup features, however, generate more data that take up storage space in these storage devices. Consequently, users may still wish to have a way to preserve these backup features while making efficient use of the storage space in these storage devices.

SUMMARY

In general, certain embodiments described herein relate to a method for data consolidation and preservation during backups of data stored in a source device from the source device to a target device. The method is executed by the source device and comprises: obtaining a first snapshot of the data and a second snapshot of the data; generating, in response to the obtaining, a first snapshot difference report using the first snapshot and the second snapshot; transmitting, in response to generating the first snapshot difference report, the first snapshot difference report to the target device to be stored with a backup copy of the data; and deleting, in response to transmitting the first snapshot difference report, the first snapshot.

In general, certain embodiments described herein relate to a non-transitory computer readable medium (CRM) comprising computer readable program code, which when executed by a computer processor enables the computer processor to perform a method for data consolidation and preservation during backups of data stored in a source device from the source device to a target device. The method comprises: obtaining a first snapshot of the data and a second snapshot of the data; generating, in response to the obtaining, a first snapshot difference report using the first snapshot and the second snapshot; transmitting, in response to generating the first snapshot difference report, the first snapshot difference report to the target device to be stored with a backup copy of the data; and deleting, in response to transmitting the first snapshot difference report, the first snapshot.

In general, certain embodiments described herein relate to a source device including: a storage storing data to be backed up to a target device; and a processor coupled to the storage. The processor is configured to: obtain a first snapshot of the data and a second snapshot of the data; generate, in response to the obtaining, a first snapshot difference report using the first snapshot and the second snapshot; transmit, in response to generating the first snapshot difference report, the first snapshot difference report to the target device to be stored with a backup copy of the data; and delete, in response to transmitting the first snapshot difference report, the first snapshot.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a system in accordance with one or more embodiments.

FIG. 1.2 shows a diagram of an example source device in accordance with one or more embodiments.

FIG. 1.3 shows a diagram of an example target device in accordance with one or more embodiments.

FIG. 2.1 shows a flowchart of a process for cleaning up snapshots in a source device in accordance with one or more embodiments.

FIG. 2.2 shows a flowchart of a process for obtaining snapshots for generation of a snapshot difference report in accordance with one or more embodiments.

FIGS. 3.1-3.6 show an implementation example in accordance to one or more embodiments.

DETAILED DESCRIPTION

Figure 4:
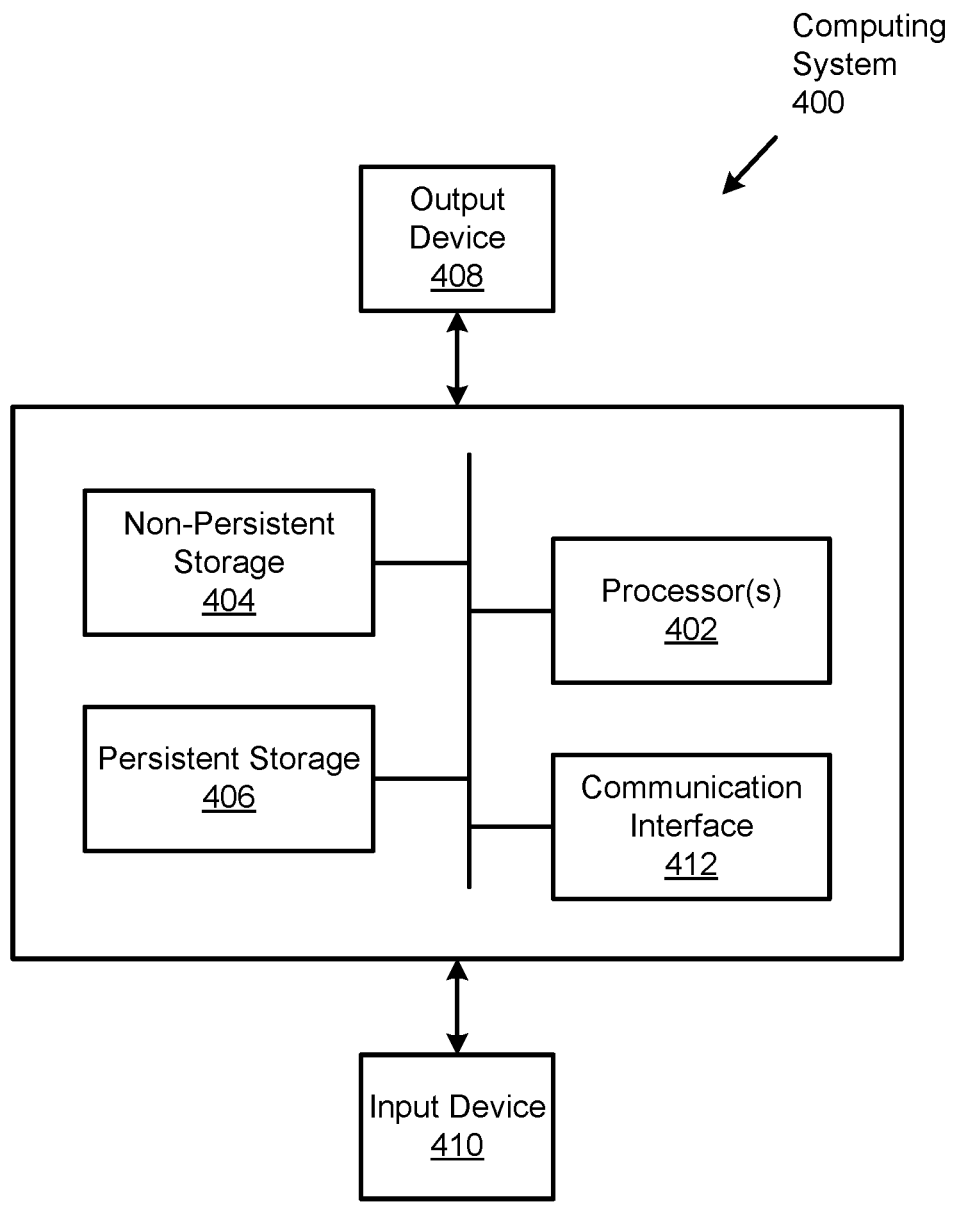
FIG. 4 shows a computer system in accordance to one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

One or more embodiments disclosed herein are directed to systems and methods for data consolidation and preservation when backing up data stored in a source device to a target device. In particular, a source device is configured to take snapshots of a data directory at a predetermined interval to preserve a most recent state of the data directory. Over time, older ones of the snapshots become unnecessary and take up storage space in the source device. In one or more embodiments, a snapshot difference report is generated using two snapshots to specify changes in the data directory that occurred during a period of time that elapsed between the taking of the two snapshots. Once the snapshot difference report is generated, the earlier of the two snapshots is deleted from the source device. This advantageously prevents multiple outdated snapshots of the data directory from being retained, directly improves the functionalities of the source device (e.g., a computing device) by conserving storage space in a storage of the source device.

In one or more embodiments, multiple snapshot difference reports directed to the same data directory may be consolidated into a single consolidated snapshot difference report. Once the consolidated snapshot difference report is generated, the snapshot difference reports used to create the consolidated snapshot difference report are deleted. This advantageously prevents storage space of a device (e.g., a target device storing a backup data of the data directory) storing the snapshot difference reports from being overused as a result of storing redundant copies of the snapshot difference reports, which, again, directly improves the functionalities of the device (e.g., a computing device) by conserving storage space in a storage of the device.

Various embodiments discussed above are now described in more detail below.

FIG. 1.1 shows a system (100) in accordance with one or more embodiments. The system (100) includes a source device (101) and a target device (103). Each of these components of the system will be described in more detail below.

In one or more embodiments disclosed herein, the source device (101) may be physical device (e.g., a computing device with at least one or more processor(s), memory, and an operating system such as the computing system 400 of FIG. 4) or a virtual device (e.g., a virtual machine executing on one or more physical devices) configure to store data.

More specifically, in one or more embodiments, the source device (101) may be any device being used as a source for data that is to be backed up to another device (e.g., the target device (103)). Examples of the source device (101) may include, but are not limited to, a data storage server, a file system (e.g., a Hadoop Distributed File System), etc. The source device (101) may be directly (or operatively, e.g., via a network (not shown)) connected to the target device (103). In one or more embodiments, the source device (101) includes any number of computing devices all or any portion of which may store a portion of the data that is to be backed up (e.g., in a distributed file system).

In one or more embodiments disclosed herein, the target device (103) may be a physical device or a virtual device (as discussed above) configured to store backup data (e.g., a backup of the data stored in the source device (101) (also referred to herein as a "backup"). More specifically, the target device (103) may be any device being used as a storage target during a data backup process. The target device (105) may be directly (or operatively, e.g., via the network) connected to the source device (101).

Additional details of each of the source device (101) and the target device (103) are discussed below in FIGS. 1.2-1.3, respectively.

Turning now to FIG. 1.2, FIG. 1.2 shows an example source device (120) in accordance with one or more embodiments of this disclosure. The source device (120) may be the same as the source device (101) described above in FIG. 1.1. In addition to the components discussed above in reference to FIG. 1.1, the source device (120) further includes: one or more source device agents (122); and a storage (124) storing a data directory (126) one or more snapshots (128). Each of the components illustrated in FIG. 1.2 is described below.

In one or more embodiments disclosed herein, the source device agent(s) (122) may be configured in hardware (e.g., circuitry), software, or any combination thereof. The source device agent(s) (122) interacts with the other components of the source device (120) to facilitate the implementation of one or more protocols, services, and/or features of the source device (120). For example, the source device agent(s) (122) may be used for performing one or more steps of processes in accordance with various embodiments of the disclosure (e.g., the processes discussed below in FIGS. 2.1-2.2). By way of example, the source device agent(s) (122) may be one or more application programming interfaces (APIs) executing on the source device (120).

In one or more embodiments disclosed herein, the storage (124) is implemented using devices that provide data storage services (e.g., storing data and providing copies of previously stored data). For example, storage (124) may include any quantity and/or combination of memory devices (i.e., volatile storage), longer term storage devices (i.e., persistent storage), other types of hardware devices that may provide short term and/or long term data storage services, and/or logical storage devices (e.g., virtual persistent storage/virtual volatile storage).

In one or more embodiments, the storage (124) may store data including, as an example, one or more files in a data directory (126). The files making up the data in the data directory (126) may be stored (i.e., organized) in one or more directories (e.g., folders) and/or sub-directories. Multiple ones of the data directory (126) may be stored in the storage (124). Additionally, in one or more embodiments, the storage may also store one or more snapshots (128), each of which is described in more detail below.

In one or more embodiments disclosed herein, a snapshot (128) includes information capturing a state of the data in the data directory (126) at a point in time. The snapshot (128) of the data directory (126) may be used to provide, at least in part, recovery of all or any portion of the data in the data directory (126) in the event that the data is corrupted or lost. For example, the information included in a snapshot (128) may be a detailed table of contents that provides an owner of the data with accessible copies of data that can be used to recover and/or restore the data back to the point at which the snapshot (128) was taken. In one or more embodiments, the snapshot (128) may include a copy of all or any portion of the data (as well as all of the access control information associated with the data) in the data directory (126) at the point which the snapshot (128) was taken.

Turning now to FIG. 1.3, FIG. 1.3 shows an example target device (140) in accordance with one or more embodiments of this disclosure. The target device (140) may be the same as the target device (103) described above in FIG. 1.1. In addition to the components discussed above in reference to FIG. 1.1, the target device (140) further includes: one or more target device agents (142); and a storage (144) storing at least one of a backup data (146), a snapshot difference report (148), and a snapshot difference report metadata file (150). Each of the components illustrated in FIG. 1.3 is described below.

In one or more embodiments disclosed herein, the target device agent(s) (142) may be configured in hardware (e.g., circuitry), software, or any combination thereof. The target device agent(s) (142) interacts with the other components of the target device (140) to facilitate the implementation of one or more protocols, services, and/or features of the target device (140). By way of example, the target device agent(s) (142) may be one or more application programming interfaces (APIs) executing on the target device (140).

In one or more embodiments disclosed herein, the storage (144) of the target device (140) is configured to store a backup data (146), a snapshot difference report (148), and a snapshot difference report metadata file (150). In one or more embodiments, the backup data (146) may be a full synthetic backup (i.e., a complete backup copy) of a portion or all of the data stored in the data directory (126) of the storage (124) in the source device (120). The backup data (146) may be used to restore and/or recover the data in the data directory (126) in the event that the data in the data directory (126) becomes corrupted or lost (e.g., accidentally deleted by the owner, partially or fully deleted through hacking by a third party, etc.).

In one or more embodiments disclosed herein, the snapshot difference report (148) includes information with regard to a change in the data stored in the data directory (126), and may be stored in association with (i.e., associated with) the backup data (146). The snapshot difference report (148) may be generated using two snapshots (128) taken at two different times to reflect a change in the data stored in the data directory (126) during a time between the two snapshots (128). For example, assume that a first snapshot A of the data directory (126) was taken on a Monday. Further assume that a second snapshot B of the data directory (126) was taken subsequently on a Wednesday (i.e., approximately 48 hours after snapshot A was taken). A snapshot difference report (148) generated using snapshot A and snapshot B will include information with regard to all of the changes to the data that occurred within the 48 hours between the capturing of snapshot A and snapshot B.

In one or more embodiments, information included in the snapshot difference report (148) may include information directed to operations including, but are not limited to: (i) a creation of new files and/or directories that are added to the data directory (126); (ii) a deletion of files and/or directories making up the data stored in the data directory (126); (iii) a renaming of files and/or directories making up the data stored in the data directory (126); and (iv) a modification of a content of the files and/or directories making up the data stored in the data directory (126).

In one or more embodiments, two or more snapshot difference reports (148) may be consolidated (i.e., merged) to generate a consolidated snapshot difference report (not shown). A non-limiting example of the consolidated snapshot difference report is discussed below in the description of FIGS. 3.5-3.6. When two or more snapshot difference reports (148) are consolidated, the original snapshot difference reports making up the consolidated snapshot difference reports are deleted. This advantageously prevents storage space of a device (e.g., a target device storing a backup data of the data directory) storing the snapshot difference reports from being overused as a result of storing redundant copies of snapshot difference reports, which directly improves the functionalities of the device (e.g., a computing device) by conserving storage space in a storage of the device.

In one or more embodiments, when a consolidated snapshot report is generated, the following rules may be observed: (1) If a first snapshot difference report (i.e., DR1) indicates the addition of one or more directories, information regarding the addition, deletion, or renaming of any files and/or sub-directories to the same added directories in a second snapshot difference report (i.e., DR2) will not be included in the consolidated snapshot difference report; (2) For any added files and/or directories in DR1, if the added files and/or directories are moved to an existing directory in DR2, information of the move will be shown as an addition of a file and/or directory in the consolidated snapshot difference report; (3) For any added directories in DR1, if any files and/or sub-directories in the added directories are moved to a newly added directory in DR2, such information of the move will not be included in the consolidated difference report; (4) if both DR1 and DR2 reports the addition of a directory, the separate addition instances will be consolidated into a single addition instance in the consolidated snapshot difference report; (5) if a directory or file is added in DR1 and then deleted in DR2, the consolidated snapshot difference report will not include information of the directory or file added in DR1; (6) if a directory is added in DR1 and renamed in DR2, the consolidated snapshot difference report will show the added directory directly with the new name; (7) if a directory is added in DR1 and modified in DR2, the consolidated snapshot difference will show that a new directory is created instead of showing the modification of the directory added in DR1; (8) if multi-layered directories are added in both DR1 and DR2, only the addition of the top-most directory is shown in the consolidated snapshot difference report; (9) if a parent directory (i.e., a top-level directory) is deleted, any operations on child directories (i.e., a sub-directory of the parent directory) will not be included in the consolidated snapshot difference report except for a renaming of a file and/or sub-directory; and (10) if a directory is renamed in DR1, subsequent operation on any sub-directories in the directory in DR2 will be updated using the original directory name of the directory added in DR1 in the consolidated snapshot difference report.

Although a list of rules is discussed above with respect to operations that occur during generation of a consolidated snapshot difference report, one of ordinary skill in the art will appreciated that the above list is not to be used to limit one or more embodiments disclosed herein. For example, other rules not listed above may be applied to the generation of the consolidated snapshot difference report without departing from the scope of one or more embodiments disclosed herein.

In one or more embodiments disclosed herein, the snapshot difference report metadata file (150) includes a set of data that describes and gives information (i.e., metadata) associated with the snapshot difference report (148), and may be stored in association with (i.e., associated with) the snapshot difference report (148). The metadata stored in the snapshot difference report metadata file (150) may include, but is not limited to: (i) a FROMSNAPSHOT entry specifying an existing snapshot of the data directory (126); (ii) a TOSNAPSHOT entry specifying a new snapshot of the data directory (126) taken after the FROMSNAPSHOT; (iii) a BACKUPSNAPSHOT entry specifying a snapshot taken during a previous full synthetic backup of the data directory (126); and (iv) a DIFFREPORTFILE entry specifying the snapshot difference report (148) to which the snapshot difference report metadata file (150) is associated. Additional details of each entry in the snapshot difference report metadata file (150) are described below in the description of FIG. 2.1.

Although the storage (144) has been described above as storing one of each of the backup data (146), the snapshot difference report (148), and the snapshot difference report metadata file (150), one of ordinary skill in the art would appreciate that multiple ones of the backup data (146) may be stored in the storage (144). For example, a backup data (146) may be stored for each data directory (126) stored in the storage (124) of the source device (120). Consequently, because each snapshot difference report (148) is associated with a respective backup data (146) and each snapshot difference report metadata file (150) is associated with a respective snapshot difference report (148), the storage (144) may include multiple ones of the snapshot difference report (148) and the snapshot difference report metadata file (150) when storing multiple ones of the backup data (146).

One skilled in the art will recognize that the architecture of the system (100), the source device (120), and the target device (140) is not limited to the components shown in FIGS. 1.1 to 1.3, respectively. For example, the system (100) may include any number of the target devices (103). Further, the source device (120) and the target device (140) may include components (e.g., a processor) not shown in FIGS. 1.2 and 1.3, respectively. Accordingly, embodiments disclosed herein should not be limited to the devices and/or components shown in FIGS. 1.1-1.3.

FIG. 2.1 shows a flowchart of a method in accordance with one or more embodiments of the invention. The method depicted in FIG. 2.1 may be performed to execute a process for cleaning up snapshots in a source device in accordance with one or more embodiments of the invention. The method shown in FIG. 2.1 may be performed by, for example, by the source device (e.g., 101, FIG. 1.1; 120, FIG. 1.2). Other components of the FIG. 1.1 may perform the method shown in FIG. 2.1 without departing from the scope of one or more embodiments disclosed herein.

While FIG. 2.1 is illustrated as a series of steps, any of the steps may be omitted, performed in a different order, additional steps may be included, and/or any or all of the steps may be performed in a parallel and/or partially overlapping manner without departing from the invention.

In Step 200, a first snapshot and a second snapshot of a data directory stored in the source device is obtained by the source device. In one or more embodiments, the source device initiates the obtaining of the first snapshot and the second snapshot in response to at least one of a full synthetic backup of a data directory and an incremental backup of the data directory.

In the context of one or more embodiments, a full synthetic backup occurs when a backup data of the data directory is created and transmitted to a target device to be stored on the target device. An incremental backup of the data directory occurs between two synthetic backups, and only a snapshot of the data directory is taken during an incremental backup to preserve a present state of the data directory. In one or more embodiments, multiple incremental backups may occur between two synthetic backups. Each of the incremental backups may occur at a predetermined interval set by a user and/or an administrator of the source device. For example, assume that a full synthetic backup of the data directory occurs at a weekly interval (i.e., occurs once every week). During this interval between the two full synthetic backup, an incremental backup may be set to occur at a daily interval (i.e., a new snapshot of the data directory is obtained once a day).

In one or more embodiments, the first snapshot is taken before (i.e., at an earlier time than) the second snapshot. Additional details of how the first snapshot and the second snapshot are obtained by the source device are discussed below in FIG. 2.2.

In Step 202, the source device generates a first snapshot difference report (e.g., 148, FIG. 1.3) using the first snapshot and the second snapshot obtained in Step 200.

In one or more embodiments, upon generation of the first snapshot difference report, the source device also: (a) generates a new snapshot difference report metadata file for the first snapshot difference report; or (b) updates an existing snapshot difference report metadata file. With respect to (a), a new snapshot difference report metadata file is generated if the source device, before obtaining the first snapshot and second snapshot in Step 200, determines that a second snapshot difference report associated with the backup data does not exist in the target device (discussed in more detail below in Step 220 of FIG. 2.2). Said another way, the new snapshot difference report metadata file is generated if the first snapshot difference report will be the first instance of a snapshot difference report generated for the data directory. In such a case, the snapshot difference report metadata file will include, as metadata, the following information: (i) a FROMSNAPSHOT entry specifying an existing snapshot of the data directory (126); (ii) a TOSNAPSHOT entry specifying a most recent snapshot (i.e., the second snapshot) of the data directory (126) taken after the FROMSNAPSHOT and used to create the first snapshot difference report; (iii) a BACKUPSNAPSHOT entry specifying a snapshot taken during a previous full synthetic backup of the data directory (126), which may be the same as the FROMSNAPSHOT; and (iv) a DIFFREPORTFILE entry specifying the first snapshot difference report.

Alternatively, in one or more embodiments and with respect to (b), the source device updates an existing snapshot difference report metadata file if the source device, before obtaining the first snapshot and second snapshot in Step 200, determines that a second snapshot difference report associated with the backup data exists in the target device (discussed in more detail below in Step 220 of FIG. 2.2). In such a case, an existing snapshot difference report metadata file associated with the second snapshot difference report is retrieved from the target device (discussed in more detail below in Step 224 of FIG. 2.2). The existing second snapshot difference report is also retrieved from the target device and consolidated (i.e., merged) with the first snapshot difference report to obtain a consolidated snapshot difference report. In response to obtaining the consolidated snapshot difference report, the retrieved existing snapshot difference report metadata file is updated to include the following information: (i) a FROMSNAPSHOT entry pointing to the TOSNAPSHOT (126); (ii) a TOSNAPSHOT entry specifying a most recently created snapshot (i.e., the second snapshot) of the data directory that is used to create the first snapshot difference report (126) taken after the FROMSNAPSHOT; (iii) a BACKUPSNAPSHOT entry specifying a snapshot taken during a previous full synthetic backup of the data directory (126); and (iv) a DIFFREPORTFILE entry specifying the consolidated snapshot difference report.

In Step 204, the first snapshot difference report is transmitted to a target device to be stored with a backup data of the data directory. In one or more embodiments, the backup data is already stored on the target device prior to the transmission of the first snapshot difference report.

In Step 206, the first snapshot is deleted from the source device after the snapshot difference report is transmitted to the target device. This advantageously prevents multiple outdated snapshots (e.g., the first snapshot) of the data directory from being retained, directly improves the functionalities of the source device (e.g., a computing device) by conserving storage space in a storage of the source device.

FIG. 2.2 shows a flowchart of a method in accordance with one or more embodiments of the invention. The method depicted in FIG. 2.2 may be performed to execute a process for obtaining snapshots for generation of a snapshot difference report in accordance with one or more embodiments of the invention. The method shown in FIG. 2.2 may be performed by, for example, by the source device (e.g., 101, FIG. 1.1; 120, FIG. 1.2). Other components of the FIG. 1.1 may perform the method shown in FIG. 2.2 without departing from the scope of one or more embodiments disclosed herein.

While FIG. 2.2 is illustrated as a series of steps, any of the steps may be omitted, performed in a different order, additional steps may be included, and/or any or all of the steps may be performed in a parallel and/or partially overlapping manner without departing from the invention.

In Step 220, before obtaining the first snapshot and the second snapshot, the source device determines whether a second snapshot difference report is stored in the target device. This second snapshot difference report may be one that was created earlier as a result of the source device initiating a full synthetic backup or an incremental backup of the data directory.

If the source device determines that the second snapshot difference report does not exist in the target device (i.e., NO in Step 220), the source device obtains (in Step 222) a most recently taken snapshot of the data directory as the first snapshot and takes a new snapshot of the data directory to use as the second snapshot. In one or more embodiments, the most recently taken snapshot of the data directory is one that is taken when a first full synthetic backup of the data directory is executed. An non-limiting example of this instance in time is described below in the implementation example of FIG. 3.1.

In Step 224, the source device obtains from the target device a snapshot difference report metadata file associated with the second snapshot difference report. This is one instance of the existing snapshot difference report metadata file discussed above in the description of Step 202.

In Step 226, the source device parses the retrieved snapshot difference report metadata file to identify a snapshot used for generating the second snapshot difference report. In one or more embodiments, the snapshot used for generating the second snapshot difference report is specified under a TOSNAPSHOT entry included in the snapshot difference report metadata file, and may include a unique parameter (e.g., a unique identifier (ID), a unique label, a unique time stamp information, etc.) that can be used to identify the snapshot.

In Step 228, the source device determines whether the snapshot identified in Step 226 is stored in a storage of the source device. If the source device determines that the snapshot identified in Step 226 is not stored in the source device (i.e., NO in Step 228), an error is displayed to a user and/or administrator of the source device in Step 230. Alternatively, if the source device determines that the snapshot identified in Step 226 exists in the source device (i.e., YES in Step 228), the source device retrieves the snapshot identified in Step 226 and uses the snapshot as the first snapshot while taking a new snapshot of the data directory (i.e., a snapshot of the current state of the data directory) to use as the second snapshot in Step 232.

To further clarify embodiments of the invention, a non-limiting example is provided in FIGS. 3.1-3.6.

Beginning of Example

As shown in FIG. 3.1, the source device (320) (e.g., 101, FIG. 1.1; 120, FIG. 1.2) initiates a full backup process and obtains a snapshot A (328A) of data stored in storage (324) (e.g., 124, FIG. 1.2) [1]. The source device (320) then transmits a backup copy of the data directory (326) to the target device (360) [2]. Upon receipt of the backup copy, the target device (360) stores, within a storage (364) thereof, the backup copy as backup data (366) [3].

Turning now to FIG. 3.2, a predetermined time has passed since the backup of the data directory (326) is completed and the source device (320) is about to initiate a process for taking a snapshot of the data directory (326). Before taking the snapshot, the source device (320) determines that a snapshot difference report is not with the backup data (366) in the target device (360) [4]. As a result, the source device (320) searches for a snapshot used during the most recent backup of the data directory (326) and obtains snapshot A (328A) [5]. The source device (320) then takes a new snapshot (i.e., snapshot B (328B)) of the data directory (326) [6]. After obtaining both snapshots, the source device (320) generates a snapshot difference report A (332A) [7]. The source device (320) also generates a snapshot difference report metadata file (334) for the snapshot difference report A (332A) [8].

Subsequently, as shown in FIG. 3.3, the source device (320) transmits the snapshot difference report A (332A) and the snapshot difference report metadata file (334) to the target device (360) to be stored with the backup data (366) [9]. After transmitting the snapshot difference report A (332A) and the snapshot difference report metadata file (334) to the target device (360), the source device (320) deletes snapshot A (328A) from the storage (324) [10].

Turning now to FIG. 3.4, a predetermined time has passed since the generation of snapshot B (328B) and the source device (320) is about the initiate a process for taking another snapshot (i.e., snapshot C (328C)) of the data directory (326). Before taking the new snapshot, the source device (320) determines that the target device (360) includes the snapshot difference report A (332A) stored with the backup data (366) [11]. In response to this determination, the source device (320) retrieves the snapshot difference report metadata file (334) associated with the snapshot difference report A (332A) [12].

Once retrieved, the snapshot difference report metadata file (334) is parsed to identify the most recent snapshot (i.e., snapshot B (328B) that was used to create the snapshot difference report metadata file (334) [13]. After identifying snapshot B (328B) as the most recent snapshot used to create the snapshot difference report metadata file (334), the source device (320) parses the storage (324) to find snapshot B (328B) [14]. After locating snapshot B (328B) in the storage (324), the source device (320) takes a new snapshot (i.e., snapshot C (328C)) of the data directory (326) [15]. After taking snapshot C (328C), the source device (320) generates snapshot difference report B (332B) using snapshot B (338B) and snapshot C (328C) [16].

Subsequently, as shown in FIG. 3.5, source device (320) retrieves snapshot difference report A (332A) from the target device (360) [17]. After retrieving snapshot difference report A (332A), the source device (320) consolidates (i.e., merges) snapshot difference report A (332A) and snapshot difference report B (332B) into a single consolidated snapshot difference report A+B (384) and deletes each of snapshot difference report A (332) and snapshot difference report B (332B) [18]. After obtaining the consolidated snapshot difference report A+B (384), the source device (320) updates the information (e.g., metadata) in the snapshot difference report metadata file (334) to associate the snapshot difference report metadata file (334) with the consolidated snapshot difference report A+B (384) and to identify snapshot C (328C) as the most recent snapshot used to create the consolidated snapshot difference report A+B (384) [19].

Finally, as shown in FIG. 3.6, after updating the snapshot difference report metadata file (334), the source device (320) transmits the consolidated snapshot difference report A+B (384) and the snapshot difference report metadata file (334) to the target device (360) to be stored with the backup data (366) [20]. After transmitting the consolidated snapshot difference report A+B (384) and the snapshot difference report metadata file (334), the source device (320) deletes snapshot B (328B) from the storage (324) [21].

End of Example

FIG. 4 shows a computer system in accordance to one or more embodiments.

Embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

The advantages discussed above throughout the detailed description should be understood as being examples associated with one or more problems being solved by embodiments of the invention. However, one or more embodiments of the invention disclosed herein should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for data consolidation and preservation during backups of data stored in a source device from the source device to a target device, the method being executed by the source device and comprising:
    obtaining a first snapshot of the data and a second snapshot of the data;
    generating, in response to obtaining the first snapshot and the second snapshot, a first snapshot difference report using the first snapshot and the second snapshot;
    performing one action selected from a group of actions comprising generating a new snapshot difference report metadata file and updating an existing snapshot difference report metadata file;
    transmitting, in response to generating the first snapshot difference report, the first snapshot difference report to the target device to be stored with a backup copy of the data; and
    deleting, in response to transmitting the first snapshot difference report, the first snapshot.

2. The method of claim 1, wherein:
    multiple snapshots, including the first snapshot and the second snapshot, of the data are generated between a first backup of the data and a second backup of the data,
    information from the multiple snapshots, including information from the first snapshot difference report, are consolidated into a single consolidated snapshot difference report.

3. The method of claim 2, wherein:
    each of the multiple snapshots are generated at a first predetermined interval, and
    among the multiple snapshots, all snapshots except for a most recent snapshot of the data are deleted from the source device.

4. The method of claim 3, wherein:
    each of the first backup of the data and the second backup of the data are executed at a second predetermined interval longer than the first predetermined interval,
    each of the first backup of the data and the second backup of the data is a full synthetic backup of the data, and
    the single consolidated snapshot difference report comprises all changes to the data between the first backup of the data and the second backup of the data.

5. The method of claim 1, wherein the one action that is selected is generating the new snapshot difference report metadata file, and wherein obtaining the first snapshot and the second snapshot comprises:
    making a determination that a second snapshot difference report associated with the backup copy of the data does not exist in the target device; and obtaining, in response to the determination:
  a snapshot, of the data, generated during a backup for generating the backup copy of the data as the first snapshot; and
  a snapshot of a current state of the data as the second snapshot.

6. The method of claim 1, wherein the one action that is selected is updating the existing snapshot difference report metadata file, and wherein obtaining the first snapshot and the second snapshot comprises:
  making a first determination that a second snapshot difference report associated with the backup copy of the data exists in the target device;
  making a second determination, based on the first determination, that a snapshot used for generating the second snapshot difference report exists in the source device; and
  obtaining, based on the second determination:
    the snapshot used for generating the second snapshot difference report as the first snapshot; and
    a snapshot of a current state of the data as the second snapshot.

7. The method of claim 6, wherein making the second determination comprises:
  obtaining, from the target device, the existing snapshot difference report metadata file associated with the second snapshot difference report;
  parsing, in response to obtaining the existing snapshot difference report metadata file, the existing snapshot difference report metadata file to identify a unique parameter associated with the snapshot used for generating the second snapshot difference report; and
  determining, by the source device and based on identifying the unique parameter for the snapshot used for generating the second snapshot difference report, that the snapshot used for generating the second snapshot difference report exists in the source device.

8. The method of claim 6, wherein the method further comprises:
  obtaining the second snapshot difference report from the target device;
  initiating, in response to obtaining the second snapshot difference report, a merging of the second snapshot difference report and the first snapshot difference report into a consolidated snapshot difference report; and
  transmitting the consolidated snapshot difference report to the target device to be saved with the backup copy of the data.

9. The method of claim 8, wherein information included in the consolidated snapshot difference report, after merging of the second snapshot difference report and the first snapshot difference report, is based on a predetermined set of rules.

10. The method of claim 9, wherein:
  the first snapshot difference report comprises information associated with a first file directory,
  the second snapshot difference report comprises information associated with changes to the first file directory including addition of a second file directory as a sub-directory of the first file directory and a renaming of the first file directory, and
  the consolidated snapshot difference report includes only information reflecting the renaming of the first file directory.

11. A non-transitory computer readable medium (CRM) storing instructions that when executed by a computer causes the computer to execute a method for data consolidation and preservation during backups of data stored in a source device from the source device to a target device, the method comprising:
  obtaining a first snapshot of the data and a second snapshot of the data;
  generating, in response to obtaining the first snapshot and the second snapshot, a first snapshot difference report using the first snapshot and the second snapshot;
  performing one action selected from a group of actions comprising generating a new snapshot difference report metadata file and updating an existing snapshot difference report metadata file;
  transmitting, in response to generating the first snapshot difference report, the first snapshot difference report to the target device to be stored with a backup copy of the data; and
  deleting, in response to transmitting the first snapshot difference report, the first snapshot.

12. The non-transitory CRM of claim 11, wherein:
  multiple snapshots, including the first snapshot and the second snapshot, of the data are generated between a first backup of the data and a second backup of the data,
  information from the multiple snapshots, including information from the first snapshot difference report, are consolidated into a single consolidated snapshot difference report.

13. The non-transitory CRM of claim 12, wherein:
  each of the multiple snapshots are generated at a first predetermined interval, and
  among the multiple snapshots, all snapshots except for a most recent snapshot of the data are deleted from the source device.

14. The non-transitory CRM of claim 13, wherein:
  each of the first backup of the data and the second backup of the data are executed at a second predetermined interval longer than the first predetermined interval,
  each of the first backup of the data and the second backup of the data is a full synthetic backup of the data, and
  the single consolidated snapshot difference report comprises all changes to the data between the first backup of the data and the second backup of the data.

15. The non-transitory CRM of claim 11, wherein the one action that is selected is generating the new snapshot difference report metadata file, and wherein obtaining the first snapshot and the second snapshot comprises:
  making a determination that a second snapshot difference report associated with the backup copy of the data does not exist in the target device; and
  obtaining, in response to the determination:
    a snapshot, of the data, generated during a backup for generating the backup copy of the data as the first snapshot; and
    a snapshot of a current state of the data as the second snapshot.

16. A source device comprising:
  a storage storing data to be backed up to a target device; and
  a processor coupled to the storage, wherein the processor is configured to:
    obtain a first snapshot of the data and a second snapshot of the data;
    generate, in response to obtaining the first snapshot and the second snapshot, a first snapshot difference report using the first snapshot and the second snapshot;
    perform one action selected from a group of actions comprising generate a new snapshot difference report metadata file and update an existing snapshot difference report metadata file transmit, in response to generating the first snapshot difference report, the first snapshot difference report to the target device to be stored with a backup copy of the data; and delete, in response to transmitting the first snapshot difference report, the first snapshot.

17. The source device of claim 16, wherein:

multiple snapshots, including the first snapshot and the second snapshot, of the data are generated between a first backup of the data and a second backup of the data, information from the multiple snapshots, including information from the first snapshot difference report, are consolidated into a single consolidated snapshot difference report.

18. The source device of claim 17, wherein:

each of the multiple snapshots are generated at a first predetermined interval, and among the multiple snapshots, all snapshots except for a most recent snapshot of the data are deleted from the source device.

19. The source device of claim 18, wherein:

each of the first backup of the data and the second backup of the data are executed at a second predetermined interval longer than the first predetermined interval, each of the first backup of the data and the second backup of the data is a full synthetic backup of the data, and the single consolidated snapshot difference report comprises all changes to the data between the first backup of the data and the second backup of the data.

20. The source device of claim 16, wherein the one action that is selected is generate the new snapshot difference report metadata file, and wherein to obtain the first snapshot and the second snapshot, the processor is further configured to:

make a determination that a second snapshot difference report associated with the backup copy of the data does not exist in the target device; and obtain, in response to the determination:

a snapshot, of the data, generated during a backup for generating the backup copy of the data as the first snapshot; and a snapshot of a current state of the data as the second snapshot.

* * * * *